(12) United States Patent
Honma

(10) Patent No.: US 8,941,922 B2
(45) Date of Patent: Jan. 27, 2015

(54) LENS APPARATUS AND IMAGE PICKUP APPARATUS INCLUDING THE LENS APPARATUS

(75) Inventor: Jyunpei Honma, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 44 days.

(21) Appl. No.: 13/293,334

(22) Filed: Nov. 10, 2011

(65) Prior Publication Data

US 2012/0127575 A1 May 24, 2012

(30) Foreign Application Priority Data

Nov. 24, 2010 (JP) ................................. 2010-260982

(51) Int. Cl.
*G02B 27/64* (2006.01)

(52) U.S. Cl.
CPC ...... *G02B 27/646* (2013.01); *G03B 2205/0007* (2013.01)
USPC ........................................... 359/557; 396/55

(58) Field of Classification Search
CPC .......... G02B 27/646; G03B 5/00–5/08; G03B 2205/0007–2205/0046; H04N 5/2328–5/23287
USPC .................. 359/554–557; 396/52–55, 73, 75; 348/208.99–208.16
See application file for complete search history.

(56) References Cited

U.S. PATENT DOCUMENTS

| | | | | |
|---|---|---|---|---|
| 5,881,324 A | * | 3/1999 | Imada | 396/52 |
| 5,905,917 A | * | 5/1999 | Imura | 396/55 |
| 6,157,779 A | * | 12/2000 | Kosaka et al. | 396/55 |
| 2004/0022530 A1 | * | 2/2004 | Okazaki et al. | 396/55 |
| 2004/0085639 A1 | * | 5/2004 | Katagishi et al. | 359/557 |
| 2006/0082674 A1 | * | 4/2006 | Noji | 348/360 |

FOREIGN PATENT DOCUMENTS

| JP | 2002318400 A | 10/2002 |
|---|---|---|
| JP | 2007-333850 A | 12/2007 |

OTHER PUBLICATIONS

Japanese Office Action for corresponding JP2010-260982, mail date Jul. 17, 2014.

* cited by examiner

*Primary Examiner* — Derek S Chapel
*Assistant Examiner* — Jeffrey Madonna
(74) *Attorney, Agent, or Firm* — Rossi, Kimms & McDowell LLP

(57) ABSTRACT

A lens apparatus includes: a correction unit moving perpendicularly to an optical axis and including a correction optical system correcting an image blur; a driving unit driving the correction unit; an engaging unit movable between an engaging position where the engaging unit abuts abutting portions of the correction unit to engage the correction unit and a non-engaging position where the engaging unit makes the correction unit movable; a biasing unit biasing the engaging unit from non-engaging position to engaging position; and a non-engaging position maintaining unit maintaining the engaging unit at non-engaging position by being engaged with the engaging unit, wherein the correction unit moves to press the non-engaging position maintaining unit beyond a range driven by the driving unit during image-blur correction to disengage the non-engaging position maintaining unit and the engaging unit, and the biasing unit moves the engaging unit from non-engaging position to engaging position.

4 Claims, 8 Drawing Sheets

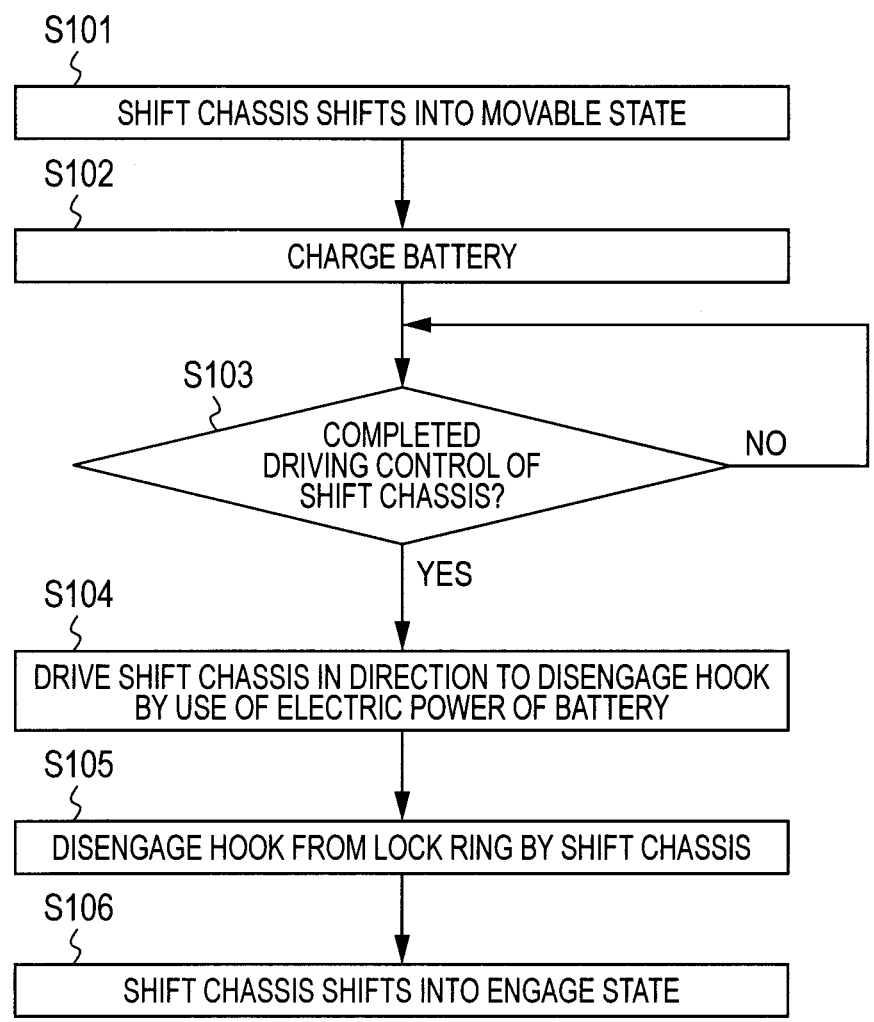

LENS APPARATUS AND IMAGE PICKUP APPARATUS INCLUDING THE LENS APPARATUS

BACKGROUND OF THE INVENTION

1. Field of the Invention

The present invention relates to a lens apparatus and an image pickup apparatus including the lens apparatus, and more particularly, to a lens apparatus including a correction unit for correcting an image blur.

2. Description of the Related Art

Conventionally, as for a unit for correcting a blur in a picked-up image (hereinafter, referred to as "image blur"), there has been used a method of correcting an image blur by detecting vibration by use of a vibration detection device provided in a lens apparatus, and by performing driving control of a correction optical system including correction lens units and image pickup elements based on information from the vibration detection device to correct the image blur.

Some of the lens apparatuses including the image-blur correction unit of this type include an engaging unit for engaging the correction optical system when image-blur correction is not performed or when a power source of the lens apparatus is turned off. The engaging unit is provided for preventing the correction optical system from being broken by disturbances. In many cases, particularly when the power source is turned off, the lens apparatus is in an environment of being liable to be influenced by the disturbances, specifically, in a state of being conveyed. Thus, there have been proposed some methods of shifting the correction optical system of the image-blur correction apparatus into the engage state when the driving control of the correction optical system is completed.

For example, Japanese Patent Application Laid-Open No. 2002-318400 discloses a method of automatically shifting the correction optical system into the engage state with a spring force by using an electromagnetic clutch for maintaining a disengage state such that the correction optical system can be operated, and by stopping electric power supply to the electromagnetic clutch when the driving control of the correction optical system for image-blur correction is completed.

However, according to the related art disclosed in Japanese Patent Application Laid-Open No. 2002-318400 mentioned above, it is necessary to continue electric power supply constantly to the electromagnetic clutch while the image-blur correction unit is enabled. Thus, electric power consumption while the image-blur correction unit is enabled increases.

Therefore, it is an object of the present invention to provide a lens apparatus and an image pickup apparatus including the lens apparatus, which contribute to reduction of the electric power consumption of the correction optical system under a movable state and in which the correction optical system can be shifted into the engage state when the driving control of the correction optical system is completed.

SUMMARY OF THE INVENTION

In order to achieve the above-mentioned object, a lens apparatus of the present invention includes: a correction unit which moves in a direction perpendicular to an optical axis and includes a correction optical system for correcting an image blur; a driving unit for driving the correction unit; an engaging unit movable between an engaging position at which the engaging unit abuts abutting portions of the correction unit so as to engage the correction unit and a non-engaging position at which the engaging unit causes the correction unit to be movable; a biasing unit for biasing the engaging unit into a direction from the non-engaging position to the engaging position; and a non-engaging position maintaining unit for maintaining the engaging unit at the non-engaging position by being engaged with the engaging unit, in which, when the correction unit moves in a direction to press the non-engaging position maintaining unit beyond a range of being driven by the driving unit at a time of image-blur correction, the non-engaging position maintaining unit and the engaging unit are disengaged from each other, and the engaging unit is moved from the non-engaging position to the engaging position by the biasing unit.

According to the present invention, it is possible to provide a lens apparatus and an image pickup apparatus including the lens apparatus, which contribute to reduction of the electric power consumption of the correction optical system under a movable state and in which the correction optical system can be shifted into the engage state when the driving control of the correction optical system is completed.

Further features of the present invention will become apparent from the following description of exemplary embodiments with reference to the attached drawings.

BRIEF DESCRIPTION OF THE DRAWINGS

FIG. 8 is a flowchart illustrating a process of shifting a shift chassis of an image-blur correction apparatus according to a third embodiment of the present invention from a movable state into an engage state.

DESCRIPTION OF THE EMBODIMENTS

In the following, exemplary embodiments of the present invention are described in detail with reference to the accompanying drawings.

First Embodiment

In the following, with reference to FIGS. 1 to 4, a lens apparatus according to a first embodiment of the present invention is described, which has a function to correct an image blur. Specifically, a structure is described, in which, when driving control of a shift chassis, which is an image-blur correction unit, is completed, the shift chassis shifts into an engage state by own weight of the shift chassis.

Figure 1:
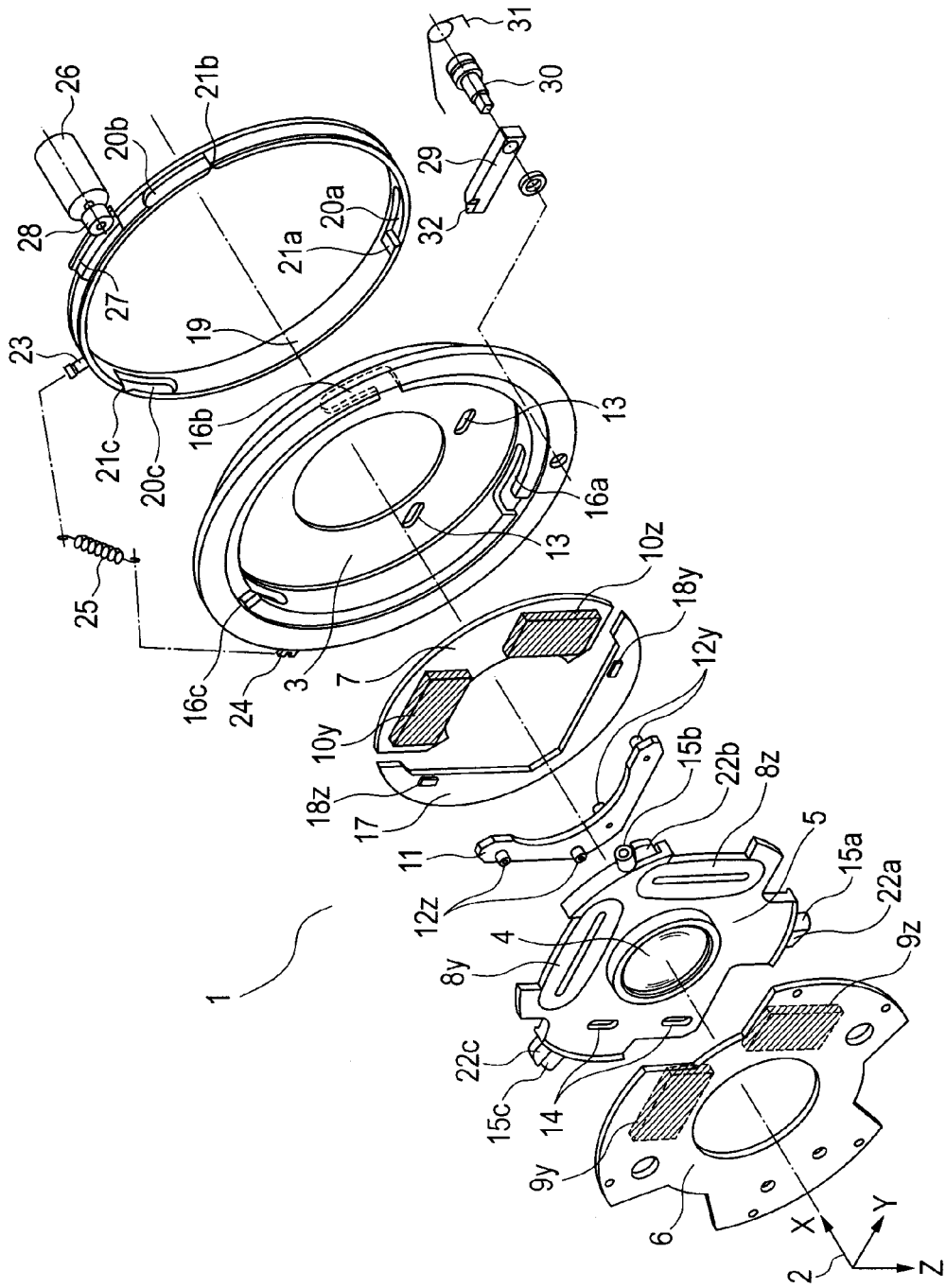
FIG. 1 is an exploded perspective view of an image-blur correction apparatus according to a first embodiment of the present invention.

FIG. 1 is an exploded perspective view of a structure of an image-blur correction apparatus 1 according to the first embodiment of the present invention. Here, an X direction of a coordinate system 2 is an optical-axis direction of an image-pickup system as a whole, and a Z direction is a direction which is perpendicular to the X direction and in which gravity acts under a state in which the lens apparatus is at a normal position, in other words, mainly in a posture at the time of being used. Further, a direction perpendicular to both the two directions is a Y direction.

In a chassis 3 of the image-blur correction apparatus 1, a shift chassis 5 to which a correction optical system 4 is mounted is incorporated as a correction unit, and a first yoke 6 and a second yoke 7 each made of a magnetic material are provided in a manner of sandwiching the shift chassis 5. Further, respectively along the Y direction and the Z direction of the coordinate system 2, coils 8y and 8z are fixed to the shift chassis 5. Still further, permanent magnets 9y and 9z are fixed to the first yoke 6 and permanent magnets 10y and 10z are fixed to the second yoke 7.

The coil 8y is positioned in a closed magnetic circuit formed of the permanent magnets 9y and 10y, and the coil 8z is positioned in a closed magnetic circuit formed by the permanent magnets 9z and 10z. In other words, the coils 8y and 8z are positioned in closed magnetic circuits formed by the first yoke 6 and the second yoke 7. Thus, those components function as a driving unit for driving the shift chassis 5. When the coils 8y and 8z are energized, the shift chassis 5 is driven according to Fleming's left hand rule.

A substantially L-shaped member 11 is provided in the chassis 3. The substantially L-shaped member 11 has one surface provided with two guide pins 12y aligned along the Y direction of the coordinate system 2, and another surface provided with two guide pins 12z aligned along the Z direction of the coordinate system 2. The two guide pins 12y on the one surface are fitted into two oblong holes 13 provided through the chassis 3, and the two guide pins 12z provided on the another surface are fitted into two oblong holes 14 provided through the shift chassis 5. With this, the shift chassis 5 is regulated from turning relatively to the chassis 3 about the optical axis.

On an outer peripheral portion of the shift chassis 5, a skid 15a is provided near an end in the Z direction of the coordinate system 2, and skids 15b and 15c are provided at two of substantially trisected positions with respect to the skid 15a on the entire periphery about the optical axis. Further, on an outer peripheral portion of the chassis 3, grooves 16a, 16b, and 16c are provided correspondingly to the skids 15a, 15b, and 15c, respectively. By arranging the skids 15a, 15b, and 15c disposed in the respective grooves 16a, 16b, and 16c within a predetermined range of play, movement of the shift chassis 5 in the optical-axis direction is regulated.

Positions of the shift chassis 5 in a plane perpendicular to the optical axis can be detected by position sensors 18y and 18z provided to an interior substrate 17. Further, the lens apparatus is provided with a vibration detection device (not shown) such as an acceleration measurement device. Information of the positions of the shift chassis 5 and information from the vibration detection device are sent to a controller (not shown). Based on those information pieces, electric currents through the coils 8y and 8z attached to the shift chassis 5 are controlled. In this way, the shift chassis 5 is capable of moving in parallel to the plane perpendicular to the optical axis without being rotated in the plane such that the correction optical system 4 held by the shift chassis 5 corrects an image blur. Driving control of the shift chassis 5 is performed by the controller.

A lock ring 19 as an engaging unit is fitted to the outer periphery of the chassis 3. The lock ring 19 is assembled so as to be turnable about the optical axis.

The lock ring 19 is provided with grooves 20a, 20b, and 20c wider than and substantially in-phase with the above-mentioned grooves 16a, 16b, and 16c provided through the chassis 3. The skids 15a, 15b, and 15c provided to the above-mentioned shift chassis 5 do not come into contact with the grooves 20a, 20b, and 20c.

The grooves 20a, 20b, and 20c provided through the lock ring 19 are respectively provided with cam portions 21a, 21b, and 21c formed at end portions on one sides of the grooves 20a, 20b, and 20c and smoothly connecting fitting portions of the lock ring 19 with respect to the chassis 3 and the outer peripheral portion of the chassis 3 to each other.

The shift chassis 5 is provided with three cam projections 22a, 22b, and 22c corresponding to the three groove-end cam portions 21a, 21b, and 21c of the above-mentioned lock ring 19, respectively. On a contact side with respect to the cam portions 21a, 21b, and 21c of the lock ring 19, each of the cam projections 22a, 22b, and 22c exhibits a shape having a smooth curvature corresponding to the cam portions 21a, 21b, and 21c. This embodiment is described on a premise that the shift chassis 5 includes the three cam projections corresponding to the three groove-end cam portions 21a, 21b, and 21c of the lock ring 19, respectively. However, the present invention is not limited thereto. It should be noted that the advantages of the present invention can be achieved as long as the shift chassis 5 includes multiple cam projections (abutting portions) corresponding to multiple groove-end cam portions of the lock ring 19, respectively.

Spring hooks 23 and 24 are provided respectively to the lock ring 19 and the chassis 3, and a tension coil spring 25 as a biasing unit is applied between the spring hooks 23 and 24. The lock ring 19 is biased by the tension coil spring 25 so as to turn about the optical axis with respect to the chassis 3. Further, a motor 26 is provided to turn the lock ring 19 in a direction reverse to a direction in which the lock ring 19 is turned by being biased by the above-mentioned tension coil spring 25. Note that, in order to transmit a drive of the motor 26 to the lock ring 19, a gear 27 and a gear 28 are provided respectively to an outer peripheral portion of the lock ring 19 and an output shaft of the motor 26, and meshed with each other.

To the outer peripheral portion on the Z direction side of the coordinate system 2 of the chassis 3, in other words, to the outer peripheral portion on a gravity direction side of the chassis 3, there is provided a stepped hook 29 as a non-engaging position maintaining unit. The stepped hook 29 is arranged at a position at which the cam projection 22a provided on the Z direction side of the shift chassis 5 comes into contact with the stepped hook 29 when the shift chassis 5 moves in the gravity direction beyond a range of being driven at the time of image-blur correction control. Further, the stepped hook 29 is biased by a torsion coil spring 31 so as to turn about a shaft 30 into a direction in which a step portion 32 comes into contact with the lock ring 19.

In this context, behaviors of the shift chassis 5, the lock ring 19, the stepped hook 29, and other components during a shift from disengagement to re-engagement of the shift chassis 5 in an engage state are described with reference to FIGS. 2 to 4.

Figure 2:
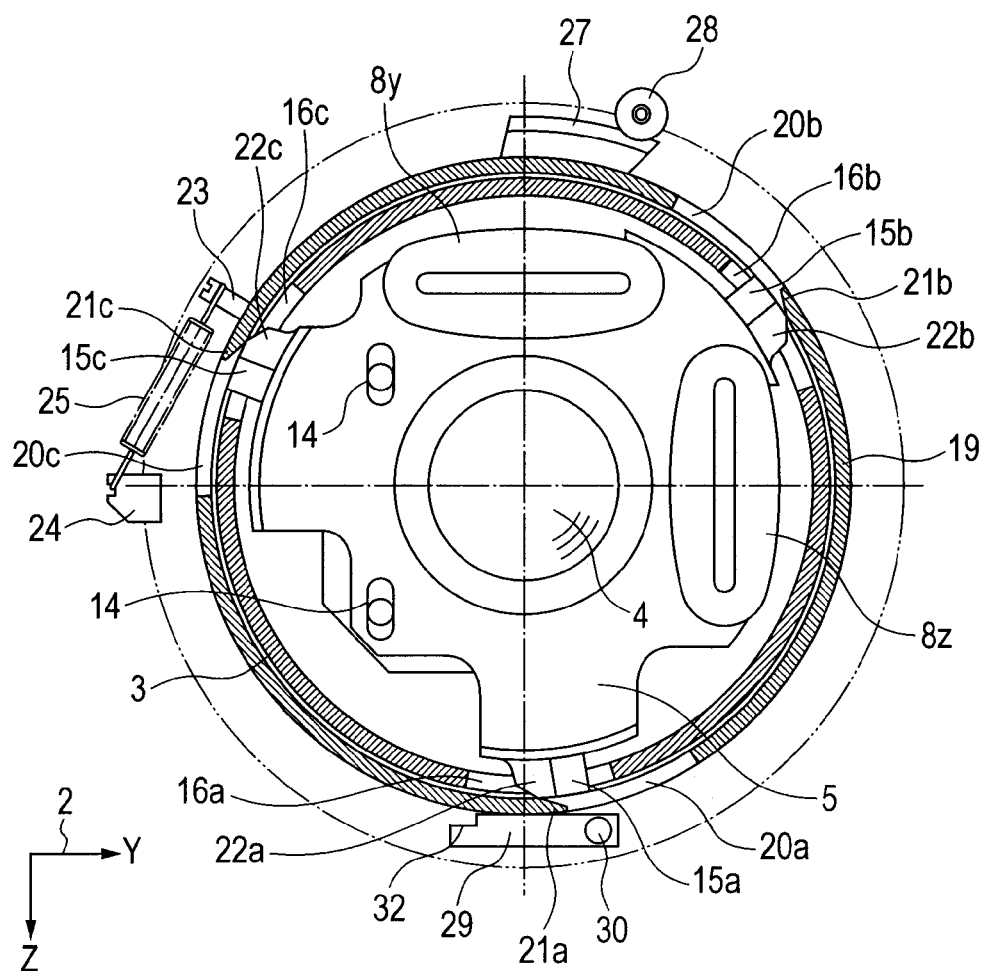
FIG. 2 is a sectional view of the image-blur correction apparatus according to the first embodiment of the present invention, illustrating a state in which a shift chassis is engaged.
Figure 3:
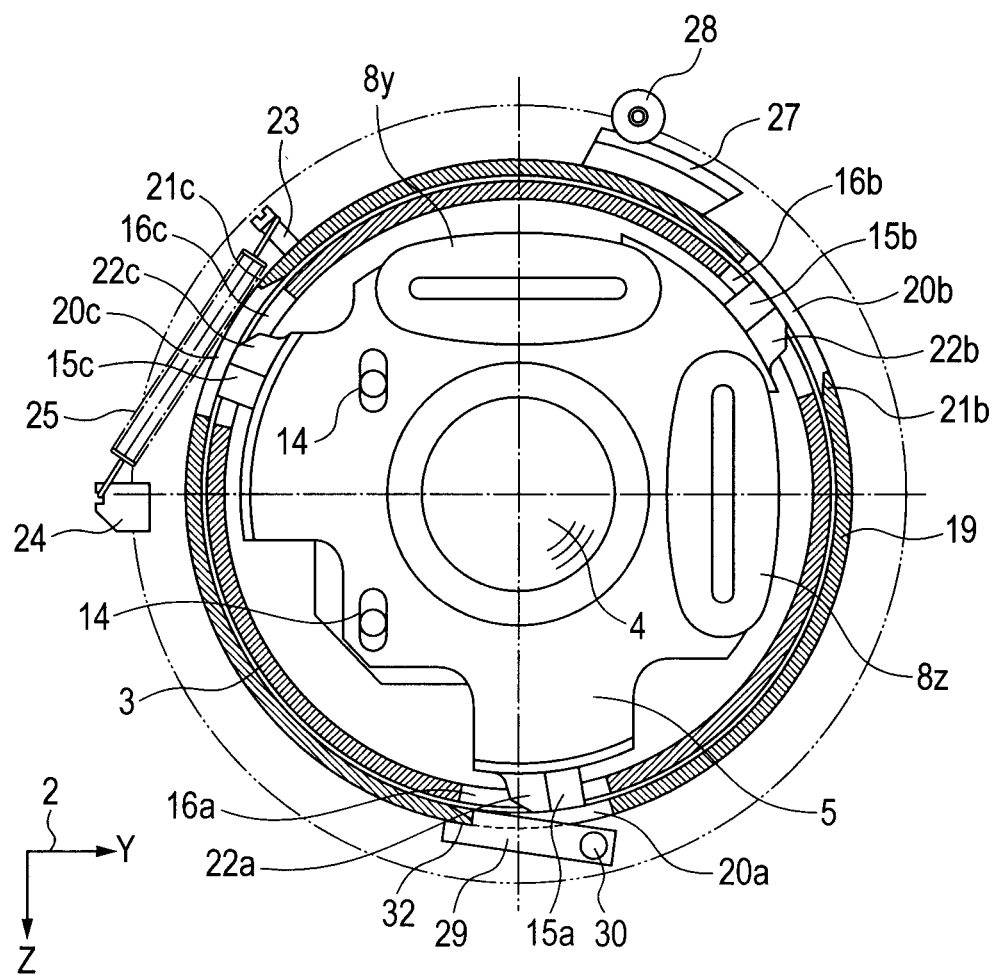
FIG. 3 is a sectional view of the image-blur correction apparatus according to the first embodiment of the present invention, illustrating a state in which the shift chassis is movable in a direction perpendicular to an optical axis.
Figure 4:
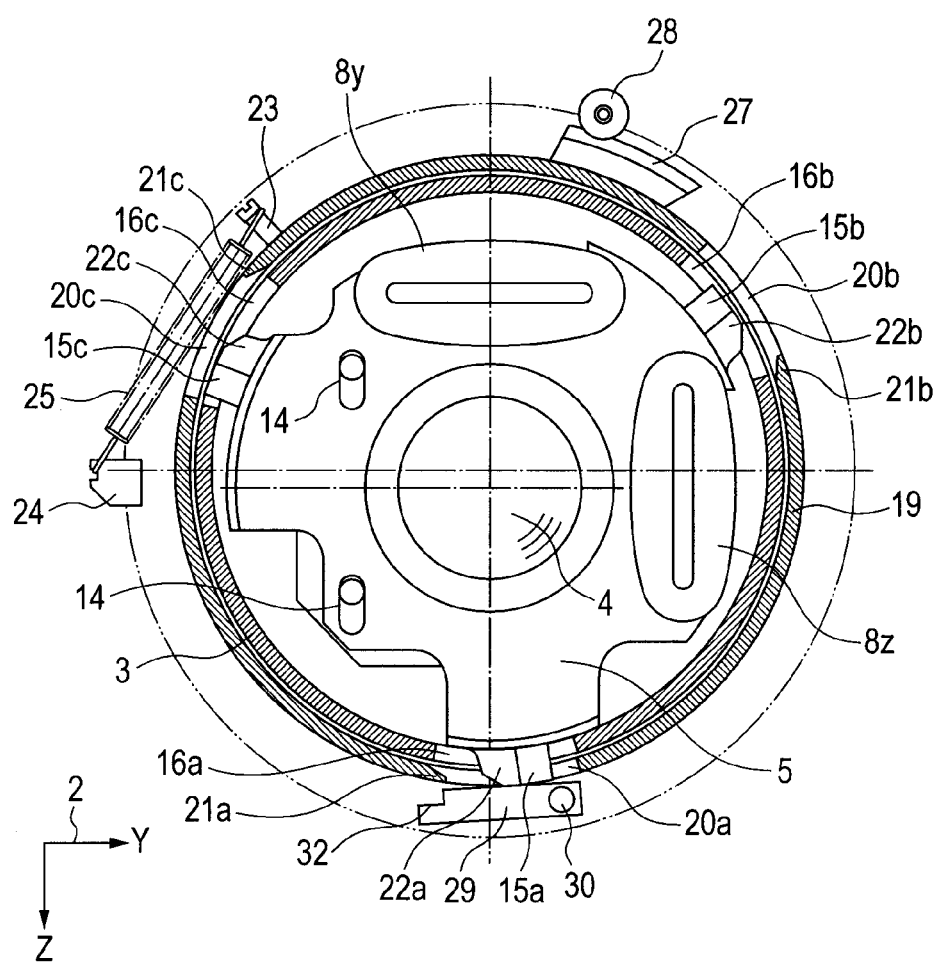
FIG. 4 is a sectional view of the image-blur correction apparatus according to the first embodiment of the present invention, illustrating a state immediately after driving control of the shift chassis is completed.

FIGS. 2 to 4 are each a main-part sectional view of the image-blur correction apparatus 1 of the present invention, illustrating a shift from engagement to disengagement of the shift chassis 5. Specifically, FIG. 2 illustrates the engage state in which the shift chassis 5 is engaged (position of the lock ring is referred to as "engaging position"), and FIG. 3 illustrates a movable state in which the shift chassis 5 is movable in the direction perpendicular to the optical axis (position of the lock ring is referred to as "non-engaging position"). Further, FIG. 4 illustrates a state immediately after the driving control of the shift chassis 5 is completed.

In the engage state illustrated in FIG. 2, the tension coil spring 25 provided between the lock ring 19 and the chassis 3 biases the lock ring 19 into a counterclockwise turning direction in FIG. 2 (hereinafter, this direction is referred to as "shift-chassis engaging direction"). With this, the three cam portions 21a, 21b, and 21c of the lock ring 19 and the three cam projections 22a, 22b, and 22c provided to the shift chassis 5 abut each other, with the result that the shift chassis 5 enters the engage state. In this case, the stepped hook 29 is biased to the outer peripheral portion of the lock ring 19 by the torsion coil spring 31 so that a part other than the step portion 32 of the stepped hook 29 abuts the outer peripheral portion of the lock ring 19.

Note that, in the engage state, an optical axis of the correction optical system 4 is arranged at a position coincident with the optical axis of the lens apparatus as a whole. Thus, when image-blur correction is not performed, the lens apparatus can be used under the state in which the shift chassis 5 is engaged.

When the image-blur correction unit is enabled, first, based on a command issued from the controller (not shown), the driving control of the shift chassis 5 is performed such that the optical axis of the correction optical system 4 mounted to the shift chassis 5 is maintained at a position coincident with the optical axis of the image-pickup system as a whole, in other words, maintained at the same position as that in the engage state. Then, the lock ring 19 is turned by the motor 26 into a clockwise turning direction in FIG. 2 (hereinafter, this direction is referred to as "shift-chassis disengaging direction"). When the lock ring 19 is turned up to a certain position, the stepped hook 29 is fitted into the groove 20a at the Z direction position of the lock ring 19 by a spring force of the torsion coil spring 31 up to a position at which the step portion 32 abuts the outer peripheral portion of the lock ring 19. The lock ring 19 is further turned up to a position beyond the position at which the step portion 32 of the stepped hook 29 is fitted into the groove 20a, and then rotation of the motor 26 is stopped and then power supply to the motor 26 and stopped. The lock ring 19 is biased by the tension coil spring 25 so as to turn in the engaging direction, and hence the lock ring 19 starts to turn in the shift-chassis engaging direction. However, before the lock ring 19 turns until the shift chassis 5 enters the engage state, the end portion of the groove 20a of the lock ring 19 is caught to a step of the stepped hook 29, and the lock ring 19 stops turning in the counterclockwise direction. Thus, a disengage state of the shift chassis 5 can be maintained. FIG. 3 illustrates a state in which the shift chassis 5 has shifted to this phase.

After that, the driving control of the shift chassis 5 is performed by the controller (not shown) to drive the shift chassis 5 in the plane perpendicular to the optical axis to correct an image blur.

FIG. 4 illustrates a state immediately after the driving control of the shift chassis 5 is completed for the following reasons: a power source of the lens apparatus is turned off; or the image-blur correction unit is disabled. When the driving control of the shift chassis 5 is completed, power supply to the coils 8y and 8z is stopped. As a result, the shift chassis 5 falls (moves) by its own weight into the gravity direction, in other words, the Z direction of the coordinate system 2 beyond a range in which the shift chassis 5 is driven during image-blur correction. Then, the cam projection 22a on a lower side of the shift chassis 5 presses and pushes down the stepped hook 29, with the result that the stepped hook 29 is disengaged from the end surface of the groove 20a provided on a lower side of the lock ring 19.

When the stepped hook 29 is disengaged from the groove 20a of the lock ring 19, the lock ring 19 turns in the shift-chassis engaging direction by the spring force of the tension coil spring 25. According thereto, the cam portions 21a, 21b, and 21c provided to the grooves of the lock ring 19 and the cam projections 22a, 22b, and 22c provided to the shift chassis 5 come into contact with each other one after another. The shift chassis 5 moves in the plane perpendicular to the optical axis along the three cams. Lastly, the shift chassis 5 is engaged when all the three cam portions are fitted against the cam projections, and re-enters the engage state illustrated in FIG. 2.

As described above, by providing the stepped hook 29 which functions to maintain the lock ring 19 in the shift-chassis movable state, electric power is no longer necessary for maintaining the shift-chassis movable state. As a result, electric power consumption can be reduced under the state in which the image-blur correction unit is enabled. Further, when the driving control of the shift chassis 5 is completed, the stepped hook 29 can be disengaged from the lock ring 19 by use of the own weight of the shift chassis 5. In addition, by the spring force of the tension coil spring 25, the shift chassis 5 can be automatically shifted into the shift-chassis engage state.

Note that, in this embodiment, although a method is proposed, in which the torsion coil spring 31 is used for biasing the stepped hook 29 to turn, another biasing method may be employed, such as a method in which a helical compression spring is used for biasing the stepped hook 29 from below. Alternatively, the hook itself may be formed of a plate spring, and a spring force generated thereby may be used.

Further, in order to shift the shift chassis from the engage state to the movable state, the lock ring 19 is turned by the motor 26 into the shift-chassis disengaging direction. Instead, the lock ring 19 may be manually turned. With this, electric power consumed for switching the shift-chassis engage state to the shift-chassis movable state can be saved.

Second Embodiment

In the following, with reference to FIGS. 5 to 7, an image-blur correction apparatus 51 according to a second embodiment of the present invention is described, in which the shift-chassis movable state can be also manually shifted to the shift-chassis engage state. Note that, description of parts similar to those in the first embodiment is omitted.

Figure 5:
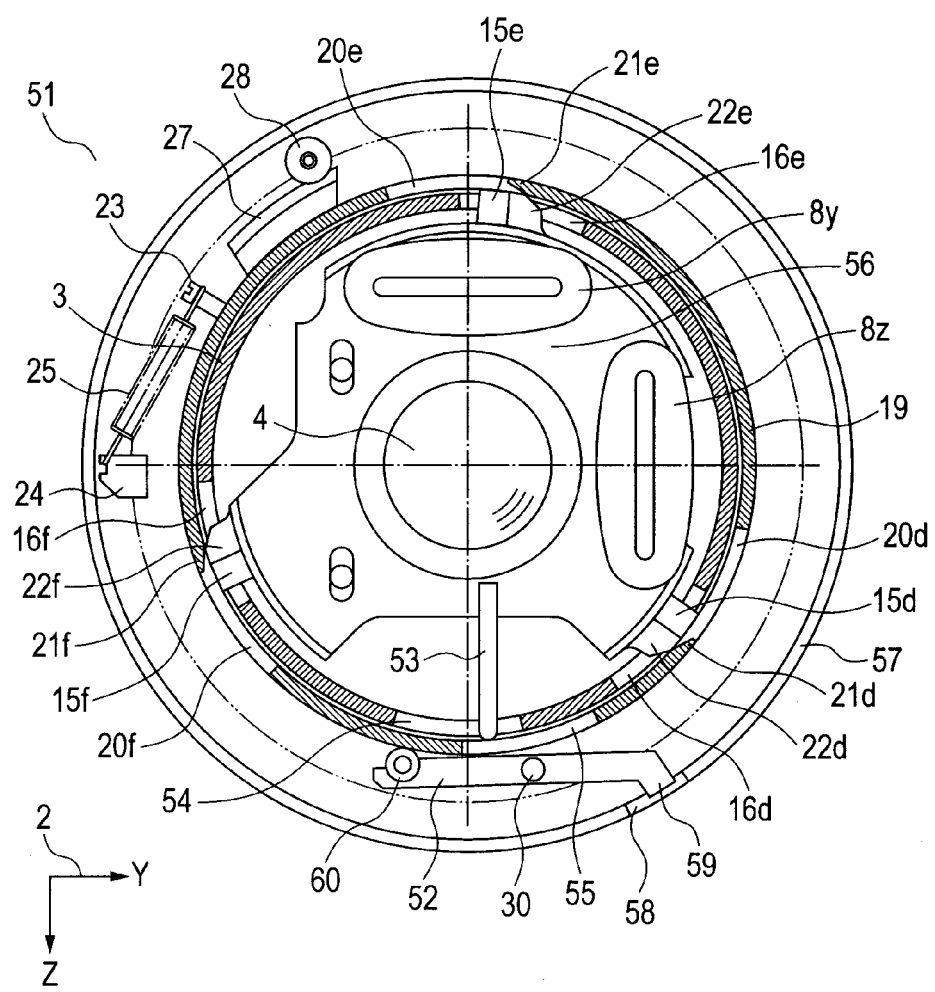
FIG. 5 is a sectional view of an image-blur correction apparatus according to a second embodiment of the present invention, illustrating a state in which a shift chassis is engaged.
Figure 6:
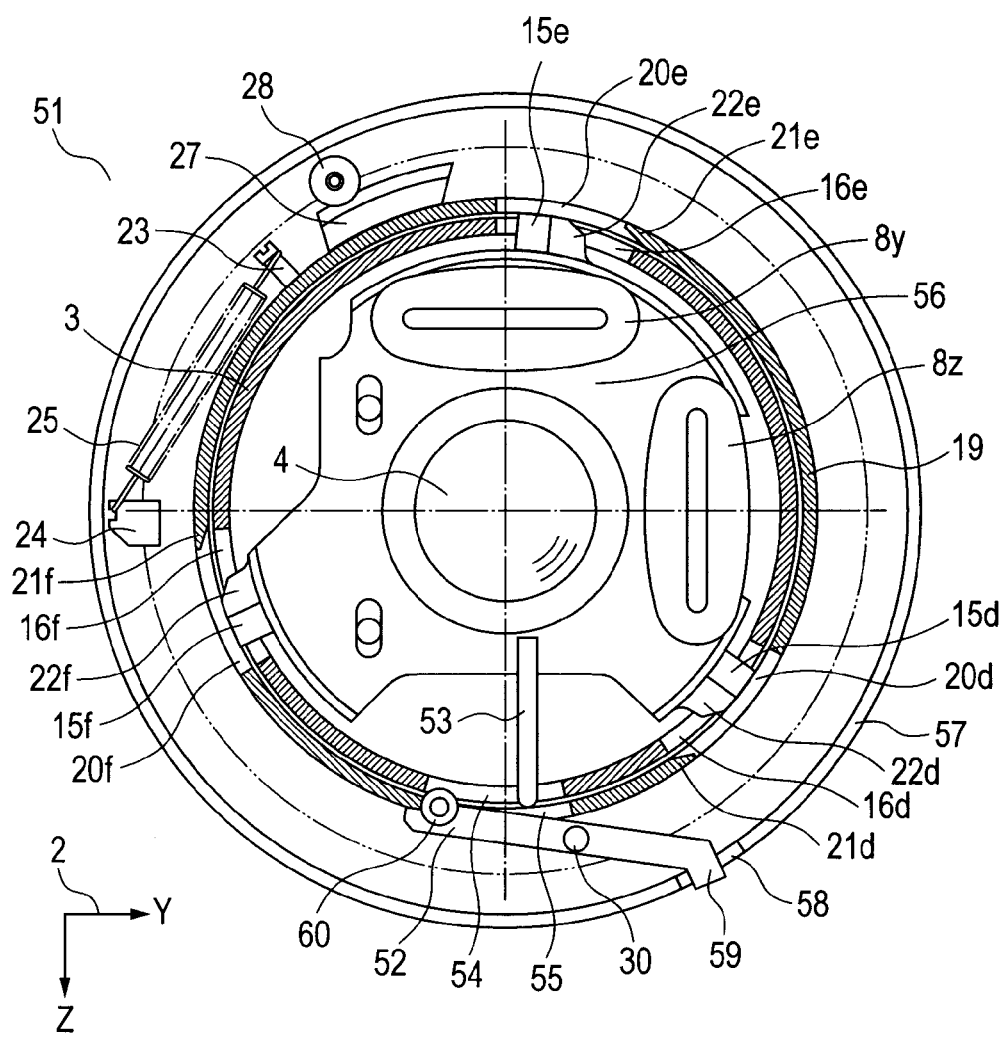
FIG. 6 is a sectional view of the image-blur correction apparatus according to the second embodiment of the present invention, illustrating a state in which the shift chassis is movable in the direction perpendicular to an optical axis.
Figure 7:
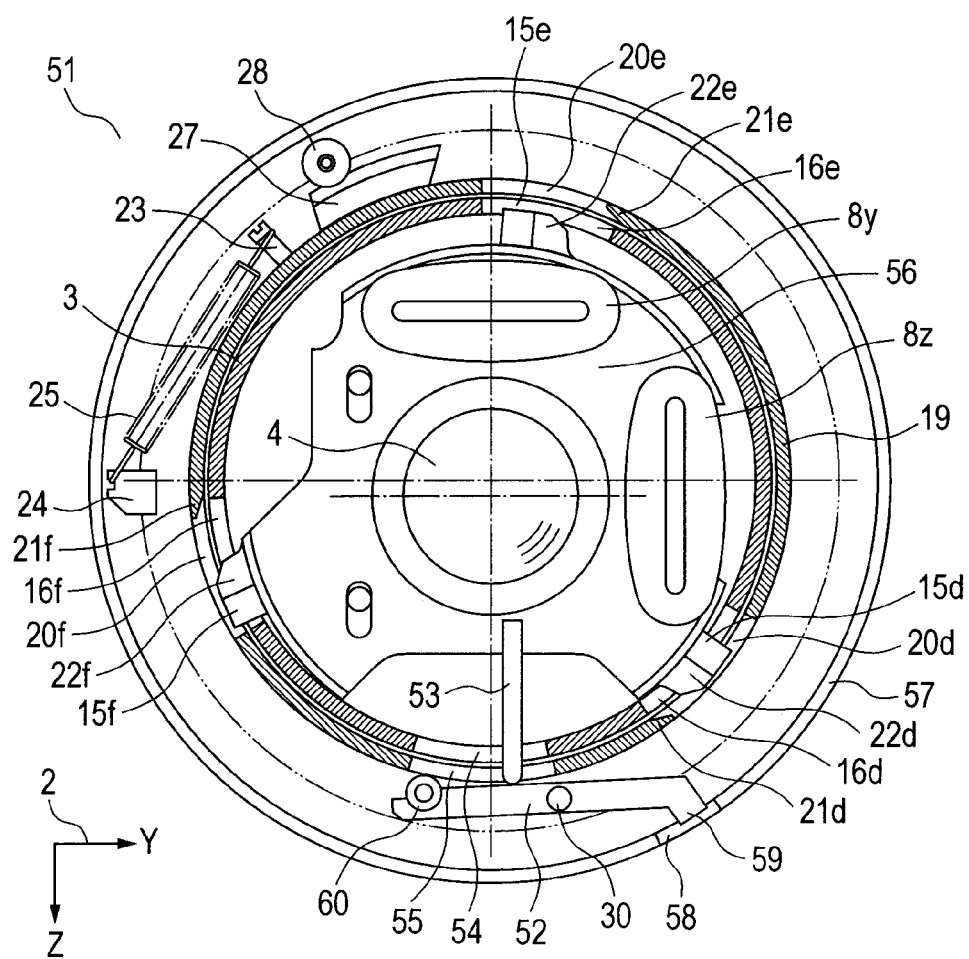
FIG. 7 is a sectional view of the image-blur correction apparatus according to the second embodiment of the present invention, illustrating a state immediately after driving control of the shift chassis is completed.

FIGS. 5 to 7 are each a main-part sectional view of the image-blur correction apparatus 51 in a lens apparatus according to the second embodiment of the present invention, illustrating a shift from engagement to disengagement of a shift chassis 56. Specifically, FIG. 5 illustrates an engage state of the shift chassis 56, FIG. 6 illustrates a movable state of the shift chassis 56, and FIG. 7 illustrates a state immediately after driving control of the shift chassis 56 is completed.

In this embodiment, three cam projections 22d, 22e, and 22f of the shift chassis 56 are not arranged at positions to push a hook 52 when the shift chassis 56 moves by gravity after electric power supply to the coils 8y and 8z is stopped. According thereto, positions of grooves 20d, 20e, and 20f provided through the lock ring 19, skids 15d, 15e, and 15f provided to the shift chassis 56, and skid grooves 16d, 16e, and 16f of the chassis 3 are changed in a turning direction about an optical axis.

As a member for disengaging the hook 52 for maintaining the shift-chassis movable state, a hook disengaging member 53 for pushing down the hook 52 is additionally provided to the shift chassis 56. Further, openings 54 and 55 through which the hook disengaging member 53 passes are provided through the chassis 3 and the lock ring 19, respectively.

In this way, provision of the hook disengaging member 53 dedicated for disengagement of the hook 52 is advantageous in preventing, for example, scratches from being formed as a result of collision of the cam projection 22a against the hook 29 (52) when the shift chassis 5 (56) moves by gravity as in the case of the first embodiment. Further, the cam projections 22d, 22e, and 22f can be arranged on the shift chassis 56 with a higher degree of freedom, and hence the provision of the hook disengaging member 53 is advantageous also in weight reduction of the shift chassis 56.

The hook 52 for causing the lock ring 19 to maintain a movable state of the shift chassis 56 is provided with a skid 60 at a part of coming into contact with the lock ring 19 so that an influence of friction caused by contact of the hook 52 and the lock ring 19 is reduced. With this, the following advantages can be obtained: reduction of loss at the time of turning the lock ring 19 by the motor 26; and reduction of resistance at the time of disengaging the hook 52 from the opening 55 provided through the lock ring 19.

The image-blur correction apparatus 51 is built in a lens-apparatus chassis 57. In a direction opposite to a side on which the skid 60 is provided, the hook 52 extends up to an exterior portion of the lens-apparatus chassis 57, and can be confirmed from a hole 58 provided through the lens-apparatus chassis 57. A leading end portion of the hook 52 serves as a manipulation portion 59.

A protruding amount of the manipulation portion 59 of the hook with respect to the lens-apparatus chassis 57 varies according to a state change from the engagement to the disengagement of the shift chassis 56. In other words, although the manipulation portion 59 is housed in the lens-apparatus chassis 57 in the engage state illustrated in FIG. 5, the manipulation portion 59 ejects to an outside of the lens-apparatus chassis 57 in the movable state illustrated in FIG. 6. By confirming the protruding amount of the manipulation portion 59 with respect to an outer peripheral surface of the lens-apparatus chassis 57, a photographer can confirm whether the shift chassis 56 is in the engage state or the movable state.

By the way, owing to a tilting manipulation of the lens apparatus (image pickup apparatus to which the lens apparatus is mounted), a hook disengaging direction, in other words, the Z direction of the coordinate system 2 and an actual gravity direction may not be coincident with each other in some cases. In this case, when the driving control of the shift chassis 56 is completed and the shift chassis 56 moves by gravity, a component of a force which acts on the hook 52 into a direction to disengage the hook 52 becomes smaller.

Further, for the purpose of achieving enhancement of correction driving control performance of the shift chassis 56 at the time of image-blur correction and weight reduction of the lens apparatus, it is necessary to set the weight of the shift chassis 56 to be smaller in some cases.

In addition, when reliability conditions required against disturbances such as fall and vibration are strict, it is necessary to increase an engaging force to be exerted by the lock ring 19 with respect to the shift chassis 56. In this case, it is necessary to increase the spring force of the tension coil spring 25, with the result that a force necessary for disengaging the hook 52 from the lock ring 19 increases.

Under some of the above-mentioned conditions, the weight of the shift chassis 56 cannot be secured for sufficiently compensating a reduction of the force to be exerted into the hook disengaging direction with respect to a force necessary for disengaging the hook 52, the reduction being caused by a mismatch of the above-mentioned hook disengaging direction and the gravity direction. In this case, it is assumed that the hook 52 cannot be disengaged from the lock ring 19 even when the shift chassis 56 moves by gravity, with the result that the shift chassis 56, which should be normally engaged, is maintained in the movable state.

In such a case, when the manipulation portion 59 of the hook is pushed in by the photographer, the hook 52 is disengaged from the lock ring 19, and the shift chassis 56 can be manually shifted into the engage state. Alternatively, the shift chassis 56 may be shifted into the engage state by driving the shift chassis 56 by the driving unit so that the shift chassis 56 is moved and by disengaging the hook 52 from the lock ring 19.

Note that, in this embodiment, although the manipulation portion 59 of the hook 52 is extended to such a position as to be capable of being directly manipulated from the outside of the lens-apparatus chassis 57, the manipulation portion 59 of the hook 52 may be arranged at any position as long as being accessible to the photographer, for example, in an inside of a cover that can be opened and closed by the photographer. When the manipulation portion 59 of the hook 52 is arranged in the inside of the cover that can be opened and closed by the photographer, the shift chassis 56 is prevented from being shifted into the engage state by improper manipulations during use of the image-blur correction apparatus at the time of photographing.

Further, a part extended directly from the hook serves as the manipulation portion 59, and the shift chassis 56 can be shifted into the engage state through manipulation of the manipulation portion 59. In this context, a mechanism including some components may be interposed so that the hook 52 can be indirectly manipulated through intermediation of the components. Alternatively, any form may be employed as long as the shift chassis 56 can be shifted into the engage state by the photographer, such as employment of a mechanism which enables the shift chassis 56 itself to be pushed from outside into a direction of disengaging the hook 52 from the lock ring 19.

Third Embodiment

In the following, an image-blur correction apparatus according to a third embodiment of the present invention is described. In this image-blur correction apparatus, even when electric power supply to the coils is interrupted, the shift chassis is shifted from the movable state to the engage state by being forcibly driven with electric power charged in a battery into the direction to disengage the hook. Note that, description of parts similar to those in the first and second embodiments is omitted.

A schematic structure of the image-blur correction apparatus in this embodiment is similar to those in the first embodiment and the second embodiment, and different therefrom in that the battery such as a capacitor (not shown) is additionally provided. The shift chassis is driven by use of electric power charged in the battery at the time of being shifted from the movable state into the engage state. Note that, the following part is described on a premise that the schematic structure of the image-blur correction apparatus in this embodiment is similar to that in the first embodiment, and components therein are described with reference to FIGS. 1 to 4.

In the following, with reference to FIG. 8, a procedure for disengaging the hook 29 by driving the shift chassis 5 is described. FIG. 8 is a flowchart illustrating a process of shifting the shift chassis according to this embodiment from the movable state into the engage state.

First, when the image-blur correction unit is enabled, the driving control of the shift chassis 5 is started, and then the shift chassis 5 shifts from the engage state into the movable state (Step S101).

Image-blur correction is performed in this movable state. At this time, electric power is charged into the battery from the outside to a main unit of the lens apparatus, a battery provided in the main unit of the lens apparatus, or the like (Step S102).

Next, judgment is made as to whether the driving control of the shift chassis 5 for image-blur correction is completed (Step S103). In a case where the driving control of the shift chassis 5 is completed, by use of the electric power charged in the battery, the shift chassis 5 is driven in the direction to disengage the hook 29 from the lock ring 19, in other words, the Z direction of the coordinate system 2 (Step S104).

By driving the shift chassis 5, the cam projection 22a pushes the hook 29, with the result that the hook 29 is disengaged from the lock ring 19 (Step S105).

Then, the lock ring 19 turns in the engaging direction, and the shift chassis 5 shifts into the engage state (Step S106). In Step S105, as a result of disengaging the hook 29 from the lock ring 19 by being pushed by the cam projection 22a, the electric power, which has been charged in the battery and used for driving the shift chassis 5 so as to push the hook 29 by the cam projection 22a, runs out. As a result, the shift chassis 5 is free from the driving control. Thus, as a result of turning of the lock ring 19 in Step S106, the shift chassis 5 shifts into the engage state.

As described above, when the shift chassis 5 shifts from the movable state into the engage state, a method of shifting the shift chassis 5 into the engage state by driving the shift chassis 5 is advantageous particularly in image pickup apparatuses, such as a photographing camera, which is used not only in a horizontal posture but also for photographing in a zenith direction, in other words, image pickup apparatuses in which an optical axis direction frequently varies with respect to the horizontal direction.

Note that, in this embodiment, the battery is separately provided in case electric power supply to the main unit of the lens apparatus is interrupted. However, when electric power can be supplied from, for example, the battery built in the lens apparatus even after image-blur correction of the shift chassis 5 is completed, the battery needs not be provided separately from the power source of the main unit, and electric power for disengaging the hook may be supplied from the built-in battery.

The image pickup apparatus including the lens apparatus according to the above-mentioned embodiments and a camera apparatus which is connected to the lens apparatus and picks up a subject image imaged by the lens apparatus can receive the following advantages of the present invention: electric power consumption of the correction optical system under the movable state can be reduced; and the correction optical system can be shifted into the engage state when the driving control of the correction optical system is completed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-260982, filed Nov. 24, 2010, which is hereby incorporated by reference herein in its entirety.

What is claimed is:

1. A lens apparatus comprising:
a correction unit movable in a direction perpendicular to an optical axis and comprises a correction optical system that corrects an image blur;
a driving unit that drives the correction unit within a driving range at a time of image-blur correction;
an engaging unit movable between a first position at which the engaging unit abuts abutting portions of the correction unit to engage the correction unit and a second position at which the engaging unit causes the correction unit to be movable;
a biasing unit that biases the engaging unit toward the first position from the second position; and
a stopper configured to engage the engaging unit to prevent the engaging unit from moving from the second position to the first position by the biasing unit,
wherein the correction unit is configured to move beyond the driving range and press the stopper to disengage the stopper from the engaging unit so that the biasing unit causes the engaging unit to move from the second position to the first position,
wherein the movement of the correction unit in the direction pressing the stopper is caused by gravity acting on the correction unit, when the driving unit stops driving the correction unit, and
wherein the movement of the correction unit in the direction pressing the stopper causes the stopper and the engaging unit to be disengaged from each other.

2. A lens apparatus according to claim 1, wherein:
the movement of the correction unit in the direction pressing the stopper is caused by the driving unit driving the correction unit, and
the movement of the correction unit in the direction pressing the stopper causes the stopper and the engaging unit to be disengaged from each other.

3. A lens apparatus according to claim 1, wherein the optical axis of the correction optical system and an optical axis of the lens apparatus as a whole are coincident with each other while the engaging unit is at the first position to engage the correction unit.

4. An image pickup apparatus comprising:
a lens apparatus; and
a camera apparatus connected to the lens apparatus and picks up a subject image imaged by the lens apparatus,
wherein the lens apparatus comprises:
a correction unit movable in a direction perpendicular to an optical axis and comprises a correction optical system that corrects an image blur;
a driving unit that drives the correction unit within a driving range at a time of image-blur correction;
an engaging unit movable between a first position at which the engaging unit abuts abutting portions of the correction unit to engage the correction unit and a second position at which the engaging unit causes the correction unit to be movable;
a biasing unit that biases the engaging unit toward the first position from the second position; and a stopper configured to engage the engaging unit to prevent the engaging unit from moving from the second position to the first position by the biasing unit, wherein the correction unit is configured to move beyond the driving range and press the stopper to disengage the stopper from the engaging unit so that the biasing unit causes the engaging unit to move from the second position to the first position, wherein the movement of the correction unit in the direction pressing the stopper is caused by gravity acting on the correction unit, when the driving unit stops driving the correction unit, and wherein the movement of the correction unit in the direction pressing the stopper causes the stopper and the engaging unit to be disengaged from each other.

* * * * *